E. B. SHIELDS & W. L. McGUIRE.
ATTACHMENT FOR HAY STACKERS.
APPLICATION FILED AUG. 6, 1910.
995,918.
Patented June 20, 1911.
3 SHEETS—SHEET 1.
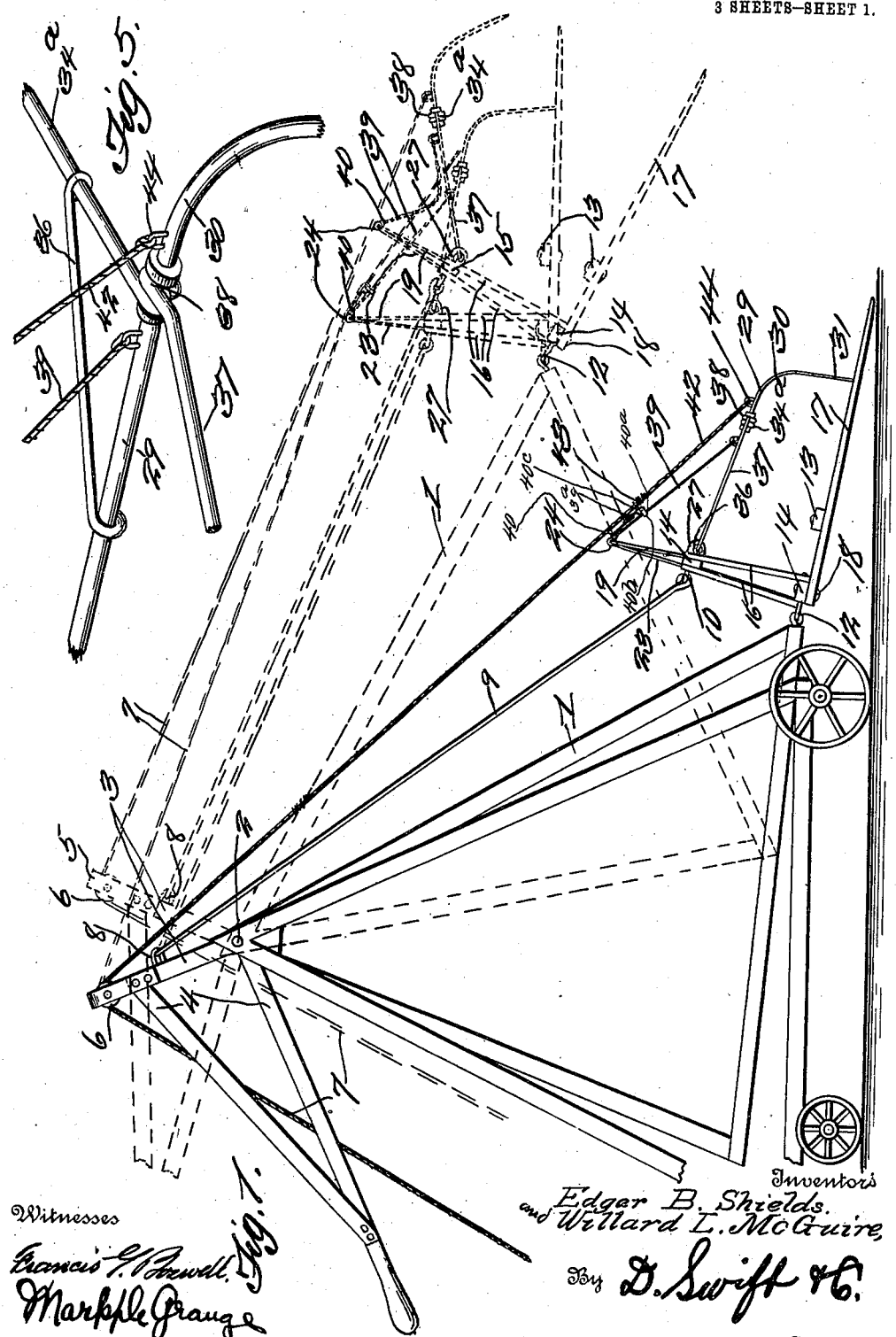
Inventors
Edgar B. Shields.
and Willard L. McGuire,
By D. Swift & Co.
Attorneys
Witnesses

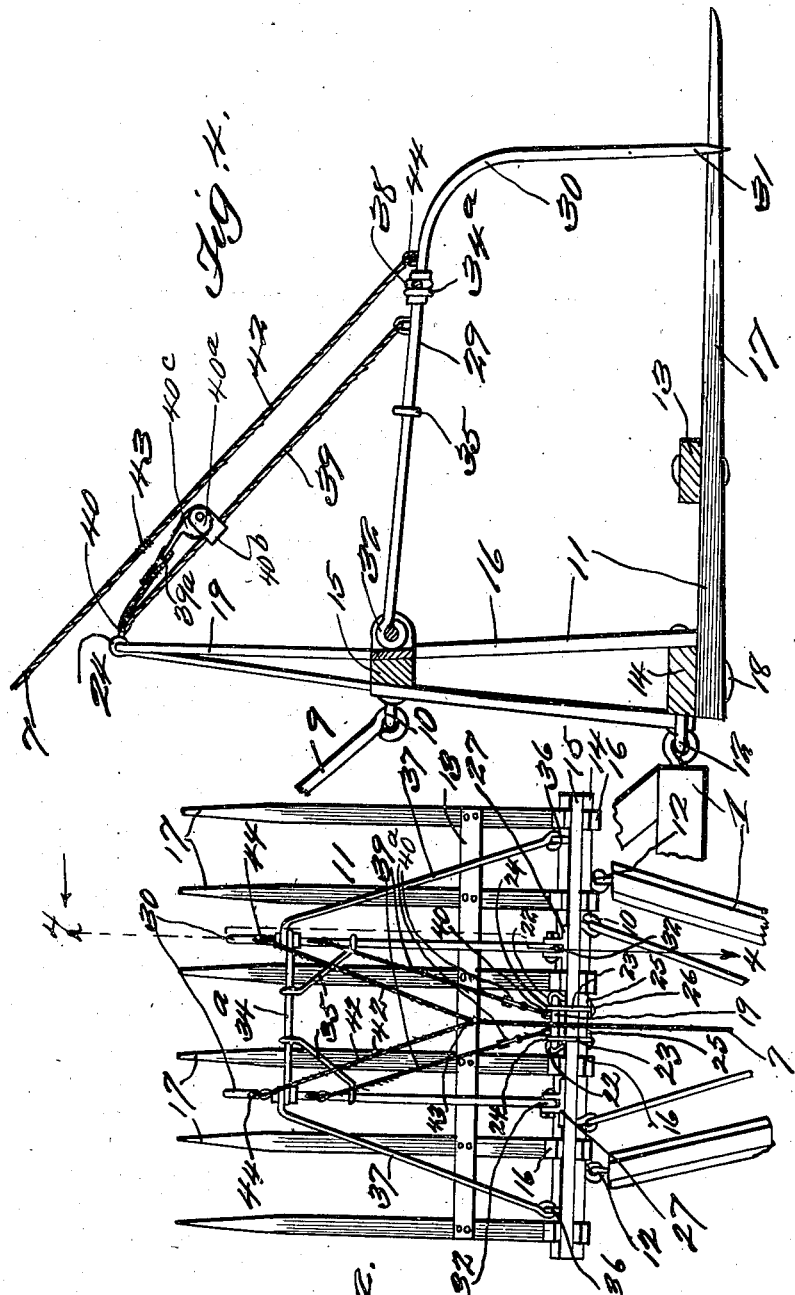

E. B. SHIELDS & W. L. McGUIRE.
ATTACHMENT FOR HAY STACKERS.
APPLICATION FILED AUG. 6, 1910.
995,918.
Patented June 20, 1911.
3 SHEETS—SHEET 3.
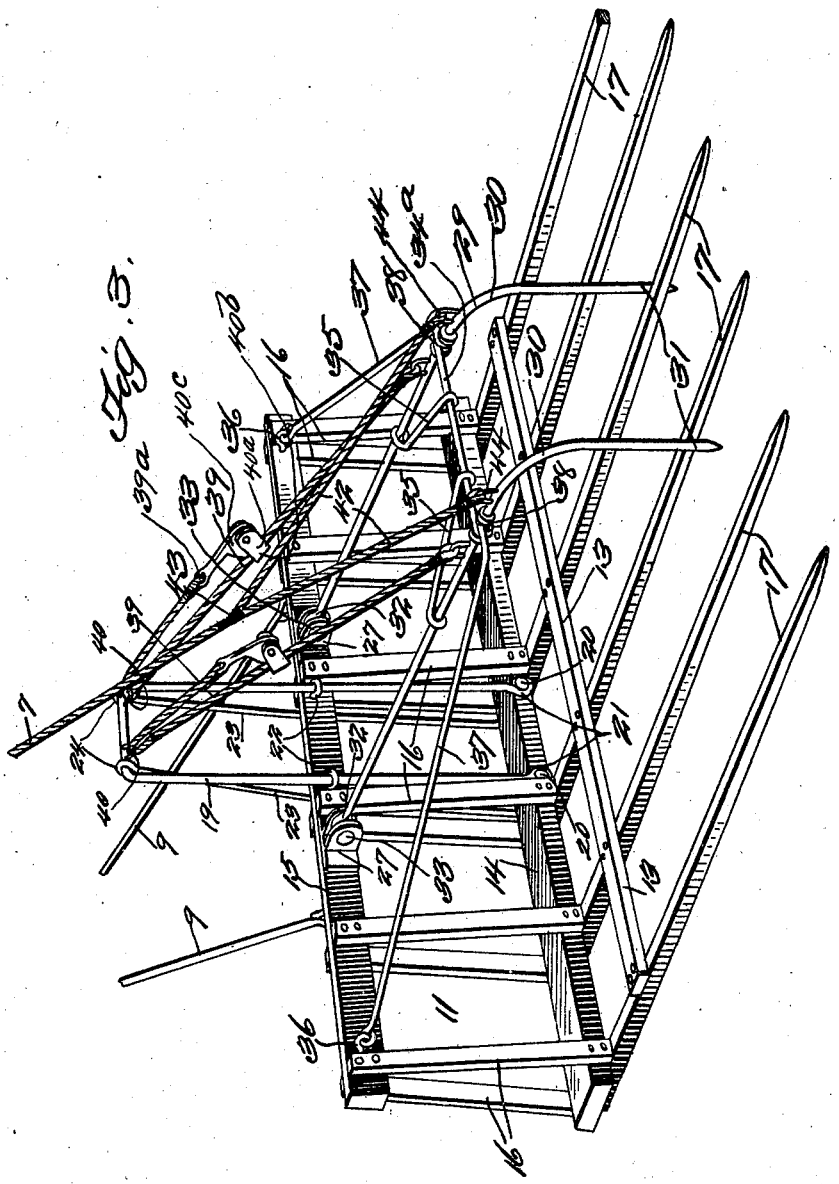
Witnesses
Inventors
Edgar B. Shields
Willard L. McGuire
By D. Swift & Co.
Attorneys

UNITED STATES PATENT OFFICE.

EDGAR B. SHIELDS AND WILLARD L. McGUIRE, OF LEBANON, KANSAS.

ATTACHMENT FOR HAY-STACKERS.

995,918.

Specification of Letters Patent. Patented June 20, 1911.

Application filed August 6, 1910. Serial No. 576,020.

*To all whom it may concern:*

Be it known that we, EDGAR B. SHIELDS and WILLARD L. MCGUIRE, citizens of the United States, residing at Lebanon, in the county of Smith and State of Kansas, have invented a new and useful Attachment for Hay-Stackers; and we do hereby declare the following to be a full, clear, and exact description of the invention, such as will enable others skilled in the art to which it appertains to make and use the same.

This invention belongs to the art of hay stackers, and it particularly pertains to a new and useful attachment for such devices, in other words known as a hay retaining device for the rake of the stacker.

The essential feature of the invention, is the provision of a hay-retaining device, for perfectly holding the hay on the rake of the stacker, subsequently to loading the rake by the hay sweep, and retaining it there, without littering the hay about the stacker, until the retaining device is released, or raised, so that the hay may be loaded upon any suitable conveyance. After the retaining device has been lifted or raised, and the hay delivered from the rake, the rake is returned to its initial position to receive another deposit of hay or similar material, after which the retaining device is returned to its normal position by gravity, where it securely holds the next deposit of hay.

A further feature of the invention, is to provide a hay retaining device or attachment, comprising suitable hooks having means for bracing the same with sufficient rigidity to hold the hooks in their places, and to cause them to move as one body. A suitable frame is carried by the rake having guy rods or chains connecting between the braced hooks for limiting the downward movement thereof.

The drawings only disclose one form of the invention, but, however, in practical fields this form may necessitate changes and alterations, to which the applicant is entitled, provided such changes and alterations are comprehended by the appended claims.

In the drawings:—Figure 1 is a side elevation of a portion of a hay stacker, showing the rake carried thereby, and clearly disclosing the hay-retaining device or attachment applied to the rake. Fig. 2 is a top plan view of the structure shown in Fig. 1, showing the rake and the hay-retaining device in plan view. Fig. 3 is a perspective view of the rake detached from that portion of the hay stacker (which is shown as applied to the hay stacker shown in Figs. 1 and 2) and illustrating the hay-retaining device in its proper position. Fig. 4 is a sectional view on line 4—4 of Fig. 3, showing the connection between the hay-retaining device or hooks and the upper portion or beam of the rake. Fig. 5 is a detail view, on an enlarged scale, of a portion of the hay-retaining device.

As to the illustrations, 1 designates the lifting frame of the usual form of hay stacker. This frame, in its upper portion, and in bearings thereof, has a transversely disposed shaft 2, forming a fulcrum for the oscillatory arm or beam 3, to which an operating lever 4 is fixed. The upper end of the oscillatory arm or beam is provided with a bifurcated casting or member 5; in which a pulley is mounted, and over this pulley 6 a suitable cable or rope 7 passes. The forward face of the oscillatory arm or beam is provided with an eye 8.

9 denotes rods, the lower forward ends of which are connected to eyes 10 of the rake 11 (which is pivoted at 12 to the lifting frame of the hay stacker), while the rear upper ends of said rods are connected in the eye 8, as will be seen clearly in Figs. 1 and 2.

The rake 11 comprises three transversely disposed beams or bars 13, 14 and 15. The bars or beams 14 and 15 are braced together by means of the vertical bars or members 16 (which are secured upon two of the faces of said bars 14 and 15). The bar 13 connects the plurality of teeth 17 (which are secured to the under face of the bar or beam 14) and is secured to said teeth by means of the bolts 18.

Arranged centrally of the bars or beams 14 and 15, and disposed perpendicularly, is an inverted U-shaped frame 19. This frame 19, at its lower end, is secured to the bar or beam 14, by means of the bolts and the eyes 20 and 21, while the central portions of the vertical uprights of the U-shaped frame are secured to the beam or bar 15, by any suitable means, preferably eye bolts 22. This inverted U-shaped frame is braced in position by the rods 23, the upper ends of which are formed with eyes 24, to receive the transverse portion of the said inverted U-shaped frame, while the eyes 25 of the lower ends thereof, receive the bolts 20, there being suitable nuts 26 applied to said bolts for holding the immediate parts in place.

27 designates a pair of castings or bearings, which are carried by the beam or bar 15. The hay-retaining device proper, designated by the character 29, comprises a pair of hooks 30 having downwardly projecting forward ends 31 and eyes 32 at their rear ends. Bolts 33 having nuts 34 upon their threaded ends, penetrate the castings 27 and the eyes 32, whereby the hooks of the hay-retaining device may be fulcrumed properly in place. The forward portions of the hooks are braced by the transverse rod 34$^a$, and between this transverse rod and the hooks, corner bracing rods 35 are arranged, in order that sufficient rigidity may be insured between the hooks and the transverse rod. The beam or bar 15, approximately at the outer ends thereof, is provided with eyes 36.

37 denotes guy rods, the inner ends of which are connected to the eyes 36, while their outer ends are connected to the hooks of the hay-retaining device, as at 38. When the hooks of the hay-retaining device are raised or lifted, the guy rods 37 move with them, because of their pivotal connection with the eyes 36. Guy ropes 39 are provided. The lower forward ends of the guy ropes 39 are secured to eyes of the hooks 30, while the upper portions of the guy ropes are passed through eyes 40 of the transverse portion of the inverted U-shaped frame. The ends of the ropes 39 (which are passed through the eyes 40) are provided with clevis members 40$^a$. These clevis members consist of the plate 40$^b$, between the sides of which the cam levers 40$^c$ are pivoted. The body of the ropes passes between the plates and the cam levers, so as to be gripped by the levers, to which the ends of the ropes 39 are connected as at 39$^a$. By these guy ropes and the clevis members the downward movement of the hooks may be limited. Furthermore by virtue of the clevis member, the ropes 39 may be adjusted.

42 designates two ropes or cables, the inner ends of which are spliced to the rope or cable 6, as at 43, while the outer ends thereof are connected, as at 44, to the hooks of the hay-retaining device.

When the rake is filled in the usual manner by the hay sweep of the hay stacker, the hay-retaining device is dropped down over the hay, in order to hold the hay in place. Then the lifting frame of the hay rack is operated in the usual manner, in order to lift the rake to its desired height, so that the hay may be deposited in any suitable conveyance. Prior to operating the lifting frame of the hay rack, the rake is slightly tilted by means of the manipulation of the operating lever 4, the arm or beam 3, and the rods 9, as will be clearly evident. When the rake has reached its desired height, whereby the deposit of hay may be delivered, the hay-retaining device is raised or oscillated upon its fulcrum, through the medium and the manipulation of the cable or rope 6, by imparting a pulling action thereon. After the hay-retaining device is lifted or oscillated, the rake is allowed to drop to an inclination, by the releasing of the lever 4, whereby the hay may slide from the rake into the conveyance. This hay-retaining device may be utilized with efficiency upon excavating shovels or similar devices.

The invention having been described, what is claimed as new and useful is:—

1. In a device as set forth, a hay stacker lifting frame, a rake pivoted thereto, an oscillatory hay retaining device fulcrumed to the rake, and designed to be returned to its initial position by gravity, bracing means for the hay retaining device to insure rigidity therefor, an inverted U-shaped frame carried by the rake, bracing means therefor, guy ropes connecting between the U-shaped frame and the hay retaining device for limiting the downward movement thereof, said guy ropes being capable of adjustment whereby the downward fall of the hay retaining device may be regulated, and means for raising the hay retaining device.

2. In a device as set forth, a hay stacker lifting frame, a rake pivoted thereto, means for rocking the rake, an oscillatory hay retaining device fulcrumed to the rake, and designed to be returned to its initial position by gravity, said hay retaining device comprising hooks having bracing means therefor, to insure rigidity, an inverted U-shaped frame carried by the rake and provided with bracing means, guy ropes connecting between the U-shaped frame and the hay retaining device to limit the downward movement thereof, said guy ropes being capable of adjustment to regulate the downward fall of the hay retaining device, and means for raising the hay retaining device.

3. In a device as set forth, a haystacker lifting frame, a rake pivoted thereto including a rear upstanding skeleton structure; an oscillatory hay retaining device including parallel arranged angular rods, and braces arranged angularly with regard to the rods, said rods and braces being pivoted to the upper portion of the skeleton structure; an inverted U-shaped frame secured to one side of the vertical upstanding skeleton structure, and including braces connected to the upper part of the inverted U-shaped frame and secured at their lower portions to the skeleton structure on the opposite side thereof; guy ropes connecting between the upper portion of the U-shaped frame and the hay retaining device for limiting the downward movement thereof, and means for raising the hay retaining device.

In testimony whereof we have signed our names to this specification in the presence of two subscribing witneses.

EDGAR B. SHIELDS.
WILLARD L. McGUIRE.

Witnesses:
 NELSON BELL,
 GLADY E. McARDLE.

Copies of this patent may be obtained for five cents each, by addressing the "Commissioner of Patents, Washington, D. C."